(12) United States Patent
Rupp

(10) Patent No.: US 6,231,201 B1
(45) Date of Patent: May 15, 2001

(54) DISPLAY UNIT

(75) Inventor: Christoph Rupp, Köln (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/169,192

(22) Filed: Oct. 8, 1998

(30) Foreign Application Priority Data

Oct. 23, 1997 (DE) ............................................. 197 46 764

(51) Int. Cl.[7] ....................................................... F21V 7/04
(52) U.S. Cl. ............................. 362/31; 362/84; 362/331; 362/332; 349/57; 349/65; 349/66
(58) Field of Search ..................... 349/57, 65, 66; 362/27, 31, 84, 231, 331, 332, 800; 359/443–460, 463, 477

(56) References Cited

U.S. PATENT DOCUMENTS 5,396,406 * 3/1995 Ketchpel .................................. 362/27
5,855,425 * 1/1999 Hamagishi ............................... 353/7

FOREIGN PATENT DOCUMENTS 27 23 483 * 11/1977 (DE) ......................................... 362/31
3625767    2/1987 (DE).

OTHER PUBLICATIONS

Patent Abstracts of Japan, publication No. 0828 6621 A, date of publication of application Nov. 1, 1996, Applicant Yazaki Corp.

* cited by examiner

Primary Examiner—Thong Nguyen
Assistant Examiner—Craig Curtis
(74) Attorney, Agent, or Firm—Martin A. Farber

(57) ABSTRACT

A display unit, in particular in a vehicle, has a display (1.) which can be transilluminated by a transilluminating device (2) in a prescribed direction. Light launched from a light source (3) into an optical conductor (4) is aligned by a first optical element (5) and deflected into a prescribed direction by a second, displaceably arranged optical element (8). As a result, an image on the display (1) is to be detected exclusively from a viewing angle region in which the display (1) is transilluminated.

27 Claims, 1 Drawing Sheet

DISPLAY UNIT

FIELD AND BACKGROUND OF THE INVENTION

The invention relates to a display unit, in particular in a vehicle, having a display, an image on the display optionally being visible from a first viewing angle region or from a second viewing angle region.

Such display units are used, for example, for satellite navigation and for representing a television image in present day motor vehicles, and are known in practice. In the case of the known display units, the display has a viewing screen which is mounted such that it can pivot about a vertical axis in a center console of the motor vehicle. This means that the viewing screen can optionally be pivoted toward the driver or the passenger, with the result that the image is visible only from the viewing angle of the passenger or of the driver. Alternatively, the display can be brought to a central position in which the image can be seen by both in a large angular region. Consequently, for example, the passenger can pivot the display in his direction during the journey and follow a television program without distracting the driver from the traffic situation. However, it is also possible for the driver and passenger to look jointly on the same display at, for example, the image of a street map or a satellite navigation display.

It is disadvantageous in the known display unit that the display is expensive to mount and that it is difficult to lay the connecting lines for the display. Moreover, the arrangement of the display unit in the motor vehicle turns out to be very difficult, since, for example, a display which is assembled in a center console and pivoted toward the passenger can frequently nevertheless be seen from the viewing angle of the driver. The driver is therefore distracted from the traffic situation all the same.

SUMMARY OF THE INVENTION

It is the object of the invention to provide a display unit of the type mentioned at the beginning such that it reliably prevents the driver from being distracted by an image intended for the passenger, and it can be mounted in the motor vehicle as simply as possible at a prescribed position—for example in an instrument panel or in a center console.

According to the invention, this object is achieved by virtue of the fact that there are provided a first optical element for radiating directed light from the display and a second optical element for deflecting the light directed by the first optical element, and that the optical elements can be pivoted toward one another or can be displaced relative to one another in their plane.

By the invention, the light radiated by the display can be directed into a prescribed angular region and/or into a prescribed direction by pivoting or displacing the optical elements. Consequently, a driver of the motor vehicle cannot detect any image on the display when the latter radiates light exclusively in the direction of the passenger. The driver is thereby reliably prevented from being distracted by an image intended for the passenger. Since the display requires no complicated mounting, its assembly proves to be particularly simple. The display unit can be fixed at virtually any position, for example in the dashboard of the motor vehicle.

The optical elements could, for example, have prisms or concave lenses. The light emanating from the first optical element can thereby optionally be deflected into one or other direction by the projecting action of the second optical element. However, in accordance with an advantageous feature of the invention, the second optical element is capable of deflecting the directed light with a particularly high intensity into a specific angular region when the second optical element has a cylindrical lens array. Furthermore, by comparison with an arrangement having prisms or concave lenses, the optical elements thereby have a particularly shallow overall depth.

The optical elements could be arranged in front of the display, for example. However, the image on the display is thereby impaired by the optical elements. In accordance with another advantageous feature of the invention, it is simple to avoid impairment of the image by the optical elements when the display can be transilluminated and when the two optical elements are arranged on a side of the display averted from a viewer.

If a separate light source such as, for example, an incandescent lamp, a LED or an fluorescent tube is used for transillumination, it is particularly advantageous for an image which is free from impairment if the two optical elements are arranged between a light source and the display.

However, the first optical element preferably has a light source which can, for example, be an electroluminescent film or an LED combined with an optical conductor, as the case may be. This renders the display unit particularly compact and requires little installation space.

The display unit according to the invention is of particularly cost effective configuration when the first optical element has strip-shaped light-radiating regions arranged parallel to the cylindrical lens array.

In accordance with another advantageous feature of the invention the second optical element deflects the light in a particularly small angular region when the width of a light-radiating region and the mutual spacing of two light-radiating regions together have approximately the width of a cylindrical lens of the cylindrical lens array.

The first optical element could, for example, be arranged in front of a light box. The display unit according to the invention has, however, a particularly shallow overall depth and a high stability when the first optical element has a plate-shaped optical conductor.

In accordance with another advantageous development of the invention, the first optical element has a particularly low weight when it consists of a plastic.

The display unit has a particularly compact design when, in accordance with an advantageous development of the invention, the light-radiating regions are arranged in a region of the first optical element which is averted from the second optical element.

A particularly uniform illumination of the display and a simple possibility of producing the first optical element are to be achieved when, in accordance with an advantageous development of the invention, the light-radiating regions of the first optical element scatter light diffusely. In a very simple form, the light-radiating regions are roughened areas of the optical conductor, but they can also, for example, be formed by electroluminescent films or by an LED, possibly having an optical conductor.

In order to improve the delimitation of the first and second viewing angle regions, in a region of its side averted from the light-radiating regions, the first optical element advantageously has stops arranged approximately between the light-radiating regions.

In accordance with another advantageous development of the invention, losses inside the optical conductor can be kept particularly low when the stops are mirrored on the side facing the interior of the first optical element.

In accordance with another advantageous development of the invention, the display can be uniformly transilluminated with a small light source when the light source is provided for launching the light into a lateral region of the optical conductor.

In accordance with another advantageous feature of the invention, it is easy to enlarge a particularly small angular region of the light directed from the optical elements when a diffusing screen is arranged between the second optical element and the display. Due to this arrangement, when the display is transilluminated in a manner directed onto the passenger, the image is also visible for passengers of different heights and from different seating positions. Furthermore, this configuration smoothes out the light deflected by the cylindrical lens array to such an extent that the individual cylindrical lenses cannot be detected.

It is possible to arrange the first optical element with the optical conductor in a displaceable fashion with respect to the second optical element. However, the display unit according to the invention is of particularly simple design when the second optical element is arranged displaceably.

In accordance with another advantageous feature of the invention, a device for displacing the second optical element is of particularly simple configuration when the second optical element is prestressed in a normal position.

Heating up of the display unit in accordance with the invention can be kept particularly low when the light source is a fluorescent tube.

A particularly good illumination of the display in conjunction with simultaneously avoiding impermissible heating of the display unit can be achieved advantageously when the light source is an LED or an electroluminescent film.

The radiation angle of the display can be enlarged or reduced optionally by displacing the cylindrical lens array. As a result, the display appears to differ in brightness for a viewer in accordance with the radiation angle. In accordance with another advantageous feature of the invention, a change in the brightness of the display can be avoided simply by virtue of the fact that the brightness of the light source can be changed correspondingly given a change in the radiation angle of the display.

In the event of extraneous light impinging on the display, the image on the display is possibly visible even without transillumination. In accordance with another advantageous feature of the invention, such extraneous light influences can be avoided simply when the display has a dark tinted or reflecting surface. This ensures that an image can be detected on the display only when the latter is transilluminated.

BRIEF DESCRIPTION OF THE DRAWINGS

With the above and other objects in view, the present invention will become more clearly understood in connection with the detailed description of a preferred embodiment, when considered with the accompanying drawings of which

BRIEF DESCRIPTION OF THE PREFERRED EMBODIMENT

Figure 1:
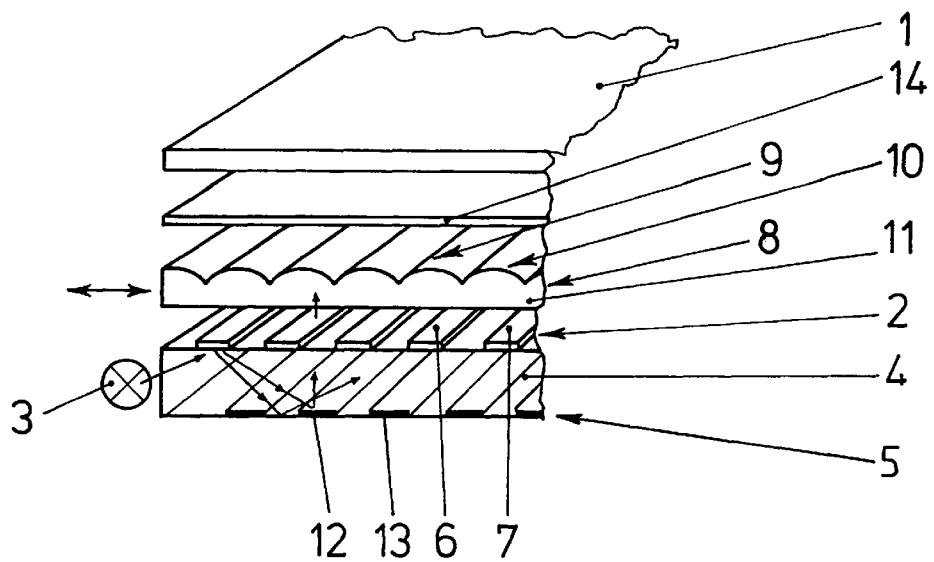
FIG. 1 shows a diagrammatic representation of a play unit according to the invention.

FIG. 1 shows a display unit according to the invention having a display 1, which can be transilluminated, and a transilluminating device 2. The transilluminating device 2 has a light source 3 which can, for example, be constructed as a fluorescent tube, and launches light into a plate-shaped optical conductor 4. The optical conductor 4 is made of plastic for the purpose of achieving as low a weight as possible for the display unit.

The optical conductor 4 is a constituent of a first optical element 5, and has a plurality of strip-shaped light-radiating regions 12, 13. In front of the optical conductor 4, the display unit has a second optical element 8 with a cylindrical lens array 11 having a multiplicity of cylindrical lenses 9, 10. The light-radiating regions 12, 13 of the first optical element 5 are arranged on the side of the optical conductor 4 averted from the cylindrical lens array 11, and extend parallel to the individual cylindrical lens 9, 10. The regions 12, 13 scatter diffusely. Strip-shaped, parallel stops 6, 7 are present on the side of the optical conductor 4, facing the cylindrical lens array 11, of the first optical element 5. The stops 6, 7 and the light-radiation regions 12, 13 extend in parallel, the stops 6, 7 being arranged in each case opposite an interspace between neighboring light-radiating regions 12, 13.

The cylindrical lens array 11 can be displaced with respect to the first optical element 5 transverse to the longitudinal extent of the cylindrical lenses 9, 10. Furthermore, the transilluminating device 2 between the display 1 and the second optical element 8 has a weakly scattering plate 14. The cylindrical lenses 9, 10 each have the width of one of the diffusely scattering regions 12, 13 and of an interspace between two diffusely scattering regions 12, 13. The stops 6, 7 are mirrored on the side facing the interior of the optical conductor 4 of the first optical element 5, in order to increase the light yield.

The first optical element 5 radiates the light propagating in the optical conductor 4 by means of the scattering strips 12, 13 into the cylindrical lens array 11. The projecting effect of the cylindrical lenses projects the light emanating from the strips 12, 13 in a specific region of space. The light beams are marked by arrows in order to clarify the drawing. Light beams are deflected in the cylindrical lens array 11 into a prescribed direction and impinge on the diffusing screen 14. Subsequently, the display 1 is transilluminated in the prescribed direction. The diffusing screen 14 serves the purpose of smoothing out the transillumination of the display 1 to such an extent that the cylindrical lenses 9, 10 cannot be detected by a viewer. Furthermore, the diffusing screen 14 is intended slightly to enlarge the angular region of the transillumination.

Figure 2:
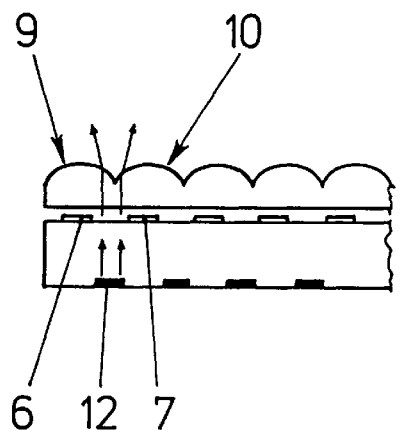
FIG. 2 shows a diagrammatic representation of a section through the display unit from FIG. 1, in a first switching position.

In a switching position, represented in FIG. 2, of the cylindrical lens array 11 from FIG. 1, the cylindrical lenses 9, 10 are arranged in each case directly in front of the stops 6, 7, and thus opposite the interspaces between the light-radiating regions 12, 13. Light emanating from the optical conductor 4 impinges on the cylindrical lens array 11 in the region between two cylindrical lenses 9, 10. The light is thereby deflected to the left and to the right. The display 1 represented in FIG. 1 is thereby transilluminated in two directions. An image on the display 1 is therefore visible from two different viewing angle regions. If the display unit according to the invention is assembled in a motor vehicle, the driver and the passenger will therefore be able to detect the image on the display.

Figure 3:
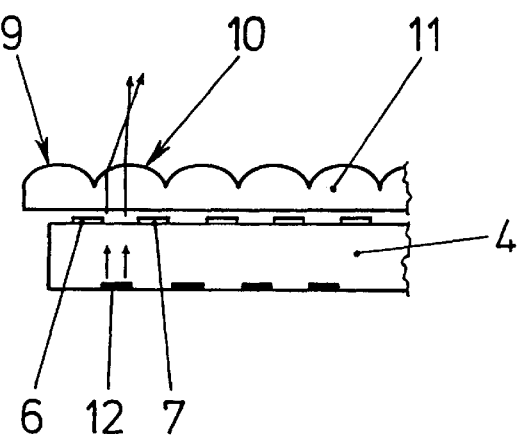
FIG. 3 shows a diagrammatic representation of a section through the display unit from FIG. 1, in a second switching position.

In the switching position represented in FIG. 3, the cylindrical lens array 11 is displaced to the left by comparison with the switching position from FIG. 2. Light emanating from the optical conductor 4 impinges in each case only on the left-hand region of the cylindrical lenses 9, 10 of the cylindrical lens array 11 and is thereby deflected exclusively to the right. In the display unit assembled in the motor vehicle, the image on the display 1 can only be detected from the viewing angle region into which the light is deflected. If the passenger is located in the direction in which the light is deflected, he can, for example, watch a video film without the driver being distracted from the traffic situation. Of course, it is also possible for the cylindrical lens array 11 to be displaced to the right from the position represented in FIG. 2. The light is thereby deflected exclusively to the left by the cylindrical lens array 11.

Figure 4:
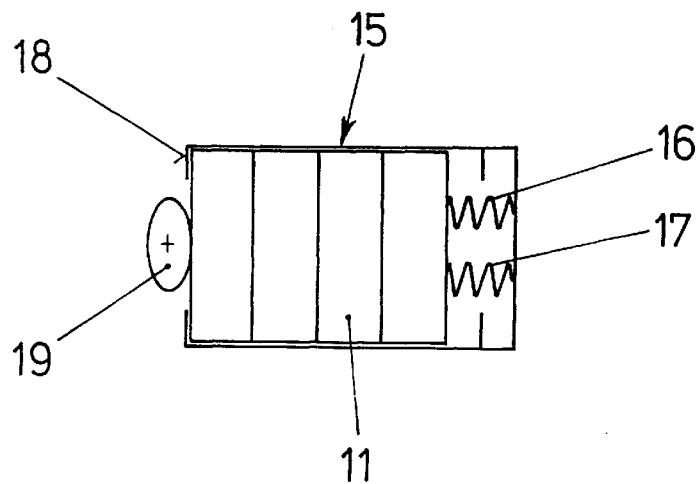
FIG. 4 shows a diagrammatic representation of a guide of a second optical element of the display unit from FIG. 1.

FIG. 4 shows a view from above of the cylindrical lens array 11 from FIG. 1. The cylindrical lens array 11 is arranged displaceably in a guide 15 and prestressed by spring elements 16, 17 against a stopper 18. This is marked by the switching position of the cylindrical lens array 11 represented in FIG. 3. By rotating a cam 19, the cylindrical lens array 11 can be moved against the force of the spring elements 16, 17 away from the stopper 18 into the switching position represented in FIG. 2.

With the array 11 fixed—it would also be possible for the first optical element 5 with the optical conductor 4 and, possibly, the light source 3 to be displaced instead of the cylindrical lens array 11. If the light source 3 is not also displaced, it is possible in a simple way—through a different spacing of the light source from the optical conductor—to achieve a different transillumination intensity of the display 1, depending on the viewing angle region set.

What is claimed is:

1. A display unit having a display, an image on the display being optionally visible from a first viewing angle region or from a second viewing angle region, said display unit comprising:
    a first optical element for radiating light in a first direction toward said display;
    a second optical element disposed between said first optical element and said display for deflecting the light directed by said first optical element to illuminate said display in a direction different from said first direction; and
    wherein said first and second optical elements are movable relative to one another transversely of said first direction to accomplish deflection of the light between said first and said second viewing angle regions, said first and said second optical elements being on a side of said display averted from a viewer.

2. The display unit as claimed in claim 1, wherein said second optical element has a cylindrical lens array.

3. A display unit having a transilluminatable display, an image on the display being optionally visible from a first viewing angle region or from a second viewing angle region, said display unit further comprising:
    a first optical element including a light source for radiating light from said light source in a first direction toward said display;
    a second optical element located between said first and said second optical elements for deflecting the light directed by said first optical element, said first and said second optical elements being arranged on a side of said display averted from a viewer;
    wherein said first and second optical elements are movable relative to one another transversely of said first direction to accomplish deflection of the light between said first and said second viewing angle regions;
    said first and second optical elements are arranged between said light source and said display; and
    said first optical element comprises a plate shaped optical conductor with said light source being located facing an edge of said optical conductor.

4. The display unit, having a display, an image on the display being optionally visible from a first viewing angle or from a second viewing angle region, said display unit comprising:
    a first optical element for radiating directed light from said display;
    a second optical element for deflecting the light directed by said first optical element, wherein said first and second optical elements are movable relative to one another, wherein said display is transilluminatable, wherein said first and second optical elements are arranged on a side of said display averted from a viewer, and wherein said first optical element has a light source.

5. The display unit according to claim 2, wherein said first optical element comprises a plate-shaped optical conductor, and has strip-shaped light-radiating regions arranged parallel to said cylindrical lens array, said light being incident on an edge of said optical conductor.

6. The display unit as claimed in claim 5, wherein said cylindrical lens array has a plurality of cylindrical lenses, and wherein the width of each of said light-radiating regions and the mutual spacing between two adjacent light-radiating regions together have approximately the width of each of said cylindrical lenses of said cylindrical lens array.

7. The display unit as claimed in claim 1, wherein said first optical element has a plate-shaped optical conductor.

8. The display unit as claimed in claim 1, wherein said first optical element is made of plastic.

9. The display unit as claimed in claim 5, wherein said light-radiating regions are arranged in a region of said first optical element which is averted from said second optical element.

10. The display unit as claimed in claim 5, wherein said light-radiating regions of said first optical element scatter light diffusely.

11. The display unit as claimed in claim 5, wherein said first optical element has stops arranged approximately between said light-radiating regions on a side opposite said light-radiating regions.

12. The display unit as claimed in claim 11, wherein said stops are mirrored on a side facing the interior of said first optical element.

13. The display unit as claimed in claim 7, further comprising a light source for launching light into a lateral region of said optical conductor.

14. The display unit as claimed in claim 1, further comprising a diffusing screen arranged between said second optical element and said display.

15. The display unit as claimed in claim 1, wherein said second optical element is arranged displaceably with respect to said first optical element.

16. The display unit as claimed in claim 15, wherein said second optical element is prestressed in a normal position.

17. The display unit as claimed in claim 3, wherein said light source is a fluorescent tube.

18. The display unit as claimed in claim 3, wherein said light source is an LED.

19. The display unit as claimed in claim 3, wherein the brightness of said light source varies as a function of angle of observation of light emitted by the source.

20. The display unit as claimed in claim 1, wherein said display has a dark tinted surface.

21. The display unit as claimed in claim 1, wherein said display unit is for use in a vehicle.

22. The display unit as claimed in claim 1, wherein said light source is an electroluminescent film.

23. The display unit as claimed in claim 1, wherein said display has a reflecting surface.

24. The display unit as claimed in claim 1, wherein said first and second optical elements are displaceable relative to one another in their plane.

25. The display unit as claimed in claim 24, wherein said first viewing angle region or said second viewing angle region is selectable by displacing one of said optical elements relative to the other such that said display radiates said image exclusively in the direction of the selected viewing angular region.

26. The display unit as claimed in claim 1, wherein said first and second optical elements are pivotable toward one another.

27. The display unit as claimed in claim 26, wherein said first viewing angle region or said second viewing angle region is selectable by pivoting one of said optical elements relative to the other such that said display radiates said image exclusively in the direction of the selected viewing angular region.

* * * * *